Oct. 7, 1958     F. SCHAER     2,855,143
MULTISTAGE RADIAL FLOW TURBOMACHINE
Filed Feb. 9, 1955
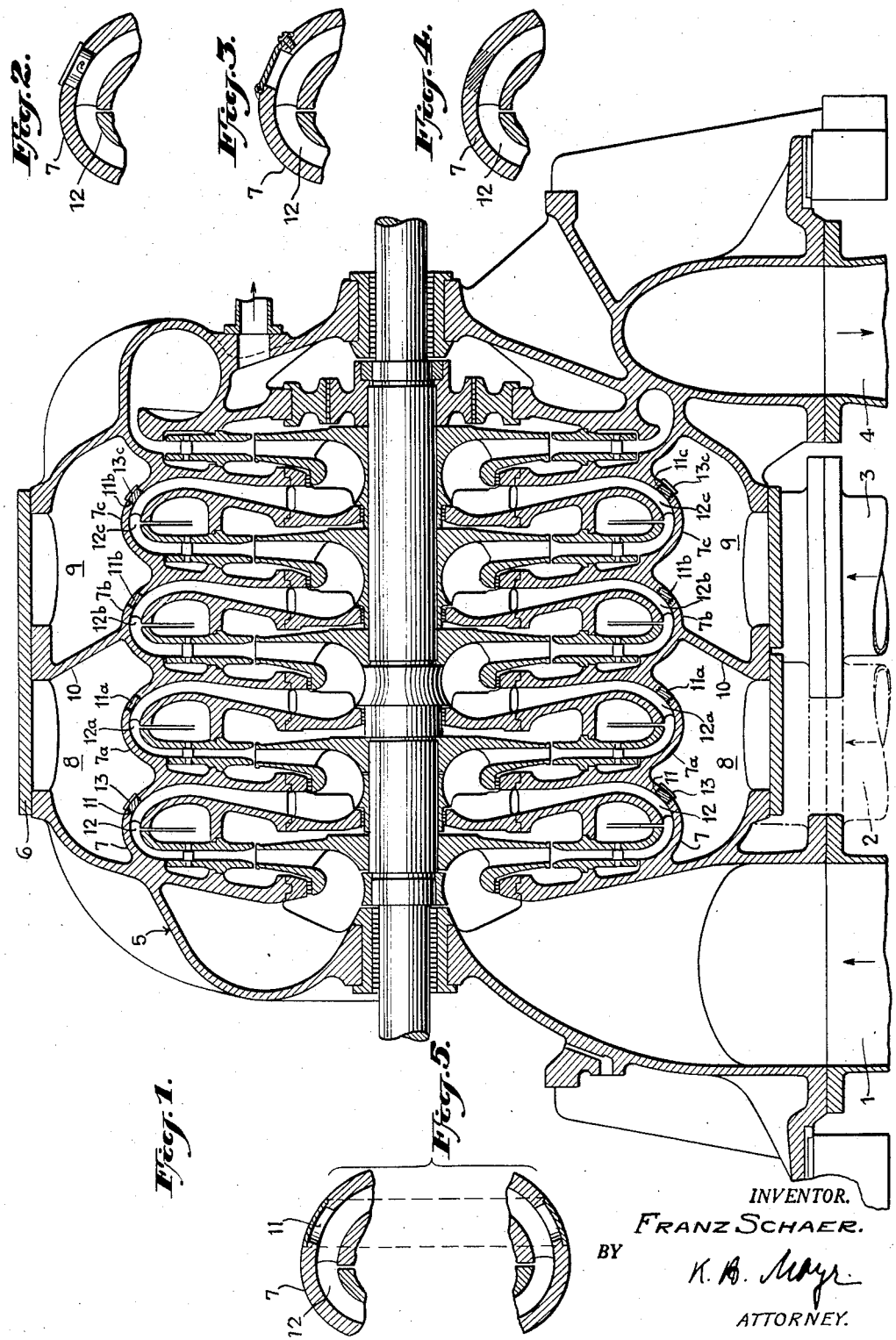
INVENTOR.
FRANZ SCHAER.
BY
K. B. Mayr
ATTORNEY.

United States Patent Office 2,855,143
Patented Oct. 7, 1958

2,855,143

MULTISTAGE RADIAL FLOW TURBOMACHINE

Franz Schaer, Winterthur, Switzerland, assignor to Sulzer Freres, Societe Anonyme, Winterthur, Switzerland, a corporation of Switzerland Application February 9, 1955, Serial No. 487,179

Claims priority, application Switzerland February 16, 1954

6 Claims. (Cl. 230—130)

The present invention relates to a multistage radial flow turbomachine having stationary channels for conducting the operating fluid from one stage into the next following stage and having at least one intermediary inlet socket for supplying operating fluid to an intermediary stage. The turbomachine according to the invention is particularly useful in connection with paper manufacturing machines. The invention considerably facilitates the manufacture of machines of the aforesaid type.

With conventional machines, casting of the casing forming the stationary channels and including the inlet socket was completed in one operation, whereby the socket was provided on a stationary channel in which the pressure of the operating fluid corresponded to that for which the particular machine was intended, i. e. a different casting had to be made for each machine to suit individual operating conditions.

It is an object of the present invention to provide multistage turbomachines having stationary channels for individually interconnecting consecutive stages and a socket adapted to be connected with any one of the stages to suit individual operating conditions. Manufacture of machines according to the invention includes substantially two consecutive steps:

(a) Quantity production of a plurality of identical casings, each casing having an annular chamber surrounding at least two channels, individually connecting two consecutive stages and having axially spaced substantially annular wall portions separating the channels from the annular chamber, apertures being provided in said wall portions for connecting the latter with the surrounding annular chamber, the chamber being provided with a pipe connecting socket;

(b) Closing, in individual casings, the apertures in the walls of selected ones of the channels, leaving at least one selected aperture open to suit the operating conditions of the individual turbomachines.

A quantity of turbomachines can be made irrespective of their eventual use, whereby the most time-consuming and expensive part of the manufacturing process, namely the casting of the casing including conduits for interconnecting consecutive stages and intermediate pipe connecting sockets, is considerably simplified, because the conduits interconnecting stages and the pipe connecting sockets are of the same design in all machines irrespective of the special operating conditions to which the individual machines must be adapted by a later manufacturing operation. The machines are almost completed in the first manufacturing step which is a mass production operation. These almost completed machines may be kept in stock. If a machine is sold, its pipe connecting socket can easily be connected with a selected conduit interconnecting the two stages in which the desired fluid pressure is produced. The delivery time of the turbomachines is thereby considerably reduced. Quantity production of the almost completed machines can be effected at a time when labor is available. Manufacture of individual machines to suit particular operating conditions becomes necessary only in very exceptional cases.

When producing machines having a plurality of intermediate pipe connecting sockets, the mass-produced almost complete machines are provided with an annular chamber surrounding the stage connecting conduits, which chamber is subdivided into as many subchambers as there are sockets. When making the individual machines ready to suit individual operating conditions, the apertures of all stage connecting conduits are closed, except the apertures of at least one of said conduits. The pipe connecting socket of the annular subchamber or subchambers surrounding only such stage connecting conduits the apertures of which are closed, is preferably also closed so that the finished machine has one or more blank sockets.

If it is desired to individually connect several sockets with different pressure stages, the apertures of the conduits connecting the respective stages are left open, so that there is at least one open aperture in a stage connecting conduit in each subchamber.

A multistage turbomachine made by the method according to the invention comprises a casing having two substantially coaxial walls forming an annular chamber which surrounds axially spaced channels formed in the inner wall of the chamber, which channels individually connect consecutive stages for fluid flow, apertures in each channel for connecting the interior of the channel with the annular chamber, the apertures in all but one channel being closed, so that only a selected channel in which a desired fluid pressure prevails communicates with the chamber. A pipe connecting socket is formed on the outer wall of the chamber for conducting fluid through the chamber to or from the selected channel.

For conveniently closing the apertures in the stage connecting channels caps may be used which are provided with a bayonet lock, so that they can be made fast by turning through 90° or 180°. Alternatively, closure flaps may be provided. The closures may be so arranged that they can be applied by the buyer without assistance from the manufacturer, and the connection of the intermediate socket with a stage connecting conduit may be changed to any desired conduit while the machine is in situ.

The novel features which are considered characteristic of the invention are set forth with particularity in the appended claims. The invention itself however and additional objects and advantages thereof will best be understood from the following description of embodiments thereof when read in conjunction with the accompanying drawing, in which Fig. 1 is a diagrammatic longituudinal sectional view of a turbomachine according to the invention;

Figs. 2 to 5 illustrate four different closures for the apertures in the channels connecting consecutive pressure stages.

The same numerals designate the same parts in all figures.

The machine shown in the drawing has five radial flow compressor stages, a main inlet socket 1, two intermediate inlet sockets 2 and 3, and an outlet socket 4. The cast casing 5 of the machine has two substantially coaxial wall portions: an outer wall portion 6 and an inner wall portion which is formed by the outer walls 7, 7a, 7b, and 7c of channels 12, 12a, 12b, and 12c, respectively, interconnecting consecutive compressor stages. The annular chamber between the two wall portions is divided by a wall 10 into two annular subchambers 8 and 9, a socket 2 being connected with the subchamber 8 and a socket 3 being connected with the subchamber 9. Each of the walls 7, 7a, 7b, and 7c has apertures 11, 11a, 11b, and 11c, respectively, for connecting the channels 12 and 12a with the subchamber 8 and the channels 12b and 12c with the subchamber 9. In the machine illustrated in Fig. 1, the apertures 11 and 11c are closed by screw caps 13 and 13c, respectively, because it is desired that the socket 2 be connected with a space in which the pressure in the conduit 12a prevails and that the socket 3 be connected with a space in which the pressure in the conduit 12b prevails.

In the illustrated machine the fluid pressure in the chamber 8 and in the socket 2 equals the pressure between the second and third compressor stage and the pressure in the chamber 9 and in the socket 3 corresponds to the fluid pressure between the third and the fourth compression stage.

Instead of screw caps, caps having a bayonet lock may be provided, as shown in Fig. 2, or flaps may be provided, as shown in Fig. 3. The apertures may also be closed by casting a suitable metal or an alloy into the aperture (Fig. 4) or by a band stretched around the wall 7, 7a, 7b, or 7c whose apertures must be closed (Fig. 5).

The turbocompressor according to Fig. 1 is made in two consecutive operations. In the first operation or manufacturing method step, a quantity of compressors is made, the castings of all compressors being alike, each casting including channels 12, 12a, 12b, and 12c and intermediate sockets 2 and 3, an opening or aperture 11, 11a, 11b, and 11c being provided in each channel wall 7, 7a, 7b, and 7c. In the second operation, selected apertures are closed. In the illustrated example, the selected apertures are the apertures numbered 11 and 11c.

If screw caps or bayonet lock caps, or flaps are used for closing the apertures, as shown in Figs. 1, 2 and 3, the apertures may be closed when the machine is in situ, i. e. the second manufacturing method step is not performed in the factory but in the plant where the machine is used. In that case, other apertures may be selected to be closed at a later time to suit different operating conditions.

What is claimed is:

1. A multistage radial flow turbomachine comprising a rotor, a stationary casing surrounding said rotor, said casing having an inlet socket and an outlet socket for the operating fluid, a plurality of channels in said casing axially spaced one from the other and exclusively connecting consecutive stages for exclusively conducting the operating fluid from one stage to the next following stage, each of said channels having an annular outside wall portion, said casing having an outer annular chamber surrounding a plurality of consecutive stages and a plurality of said annular outside wall portions, said annular chamber being placed between said inlet socket and said outlet socket, an intermediate pipe connecting socket connected with said annular chamber, at least one aperture in each of said wall portions for effecting communication between said outer annular chamber and said channels, and closure means permanently closing said aperture in a selected one of said wall portions, the aperture in the unselected wall portion remaining permanently unclosed and unobstructed for providing a passage for a portion of the operating fluid flowing between selected consecutive stages, said passage connecting said intermediate socket through said annular chamber with the selected channel whereby operating fluid can be supplied into or withdrawn from the turbomachine at a predetermined intermediate pressure.

2. A multistage radial flow turbomachine as defined in claim 1 in which a plurality of apertures is provided in each of said wall portions, the apertures in the same wall portion being placed in a plane normal to the rotation axis of said rotor, said closure means being formed by bands wrapped around the individual selected wall portions adjacent to the apertures in the selected wall portions for closing said apertures.

3. A multistage turbomachine as defined in claim 1 in which said closure means are formed by metal, cast into the selected apertures.

4. A multistage turbomachine as defined in claim 1 in which said closure means are formed by plugs, screwed into the selected apertures.

5. A multistage radial flow turbomachine comprising a rotor, a stationary casing surrounding said rotor, said casing having an inlet socket and an outlet socket for the operating fluid, a plurality of channels in said casing, said channels being axially spaced one from the other and exclusively connecting consecutive stages for exclusively conducting the operating fluid from one stage to the next following stage, each of said channels having an annular outside wall portion, a plurality of outer annular chambers in said casing, each of said annular chambers surrounding a plurality of consecutive stages and a plurality of said channels and of said annular outside wall portions, said annular chambers being placed between said inlet socket and said outlet socket, an additional pipe connecting socket connected with each of said annular chambers, a plurality of openings in each of said annular wall portions for effecting communication between said channels and the respective annular chamber, and closure means closing said openings in selected ones of said annular wall portions, the openings in the unselected annular wall portions remaining permanently unclosed for providing passages for portions of the operating fluid flowing between selected consecutive stages, said passages individually connecting selected sockets through selected respective chambers with the selected channels whereby operating fluid can be supplied to or withdrawn from the turbomachine at predetermined intermediate pressures.

6. A multistage radial flow turbomachine as defined in claim 5 in which a cover means is provided on a selected one of said additional sockets for closing the selected additional socket.

References Cited in the file of this patent

UNITED STATES PATENTS

| | | |
|---|---|---|
| 1,037,244 | Guy | Sept. 3, 1912 |
| 1,038,200 | Rateau | Sept. 10, 1912 |
| 1,102,635 | Banner | July 7, 1914 |
| 1,135,364 | Doble | Apr. 13, 1915 |
| 1,221,822 | Bodinson | Apr. 10, 1917 |
| 1,541,171 | Noble | June 9, 1925 |
| 2,399,046 | Larrecq | Apr. 23, 1946 |
| 2,741,423 | Lombard | Apr. 10, 1956 |

FOREIGN PATENTS

| | | |
|---|---|---|
| 17,283 | Great Britain | July 6, 1916 |
| 25,391 | Great Britain | of 1905 |
| 343,385 | Great Britain | Feb. 19, 1931 |